March 24, 1931. H. J. WOOCK 1,797,389
TIRE MEASURING TAPE
Filed March 8, 1929
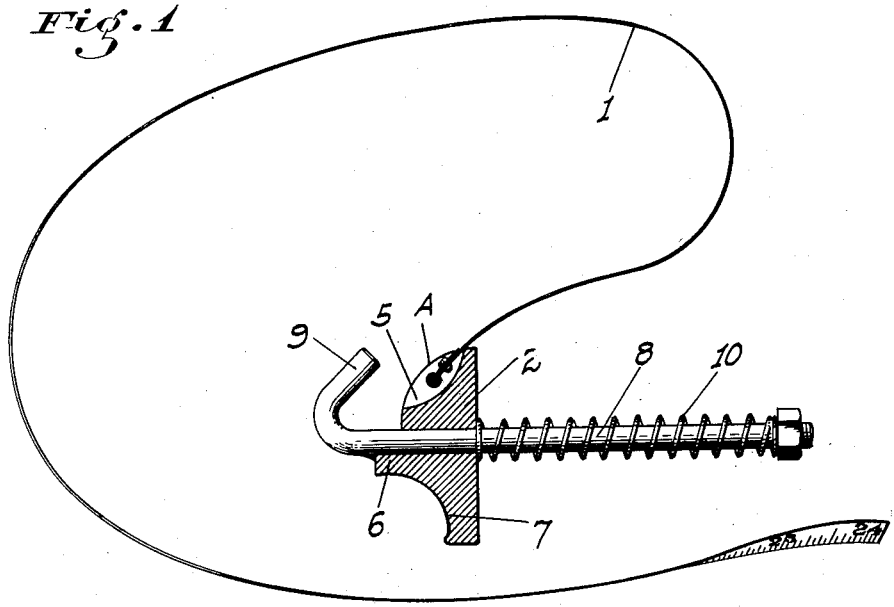
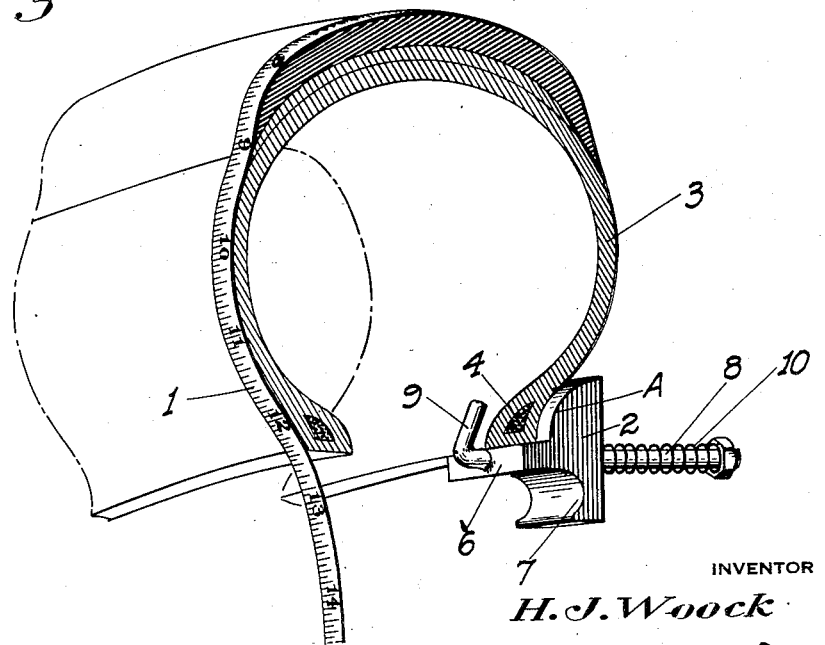
INVENTOR
H. J. Woock
BY
ATTORNEY Patented Mar. 24, 1931

1,797,389

UNITED STATES PATENT OFFICE

HERBERT J. WOOCK, OF LODI, CALIFORNIA, ASSIGNOR TO SUPER MOLD CORPORATION, OF LODI, CALIFORNIA

TIRE-MEASURING TAPE

Application filed March 8, 1929. Serial No. 345,381.

This invention relates to measuring tapes, my principal object being to provide a device especially designed and adapted for measuring the exterior cross-sectional periphery of automobile tires so as to obtain the accurate measurement thereof for the purpose fully set forth in my co-pending application of patent Serial No. 343,098 filed February 27, 1929.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved measuring tape.

Fig. 2 is a perspective view of the tape as in operation in connection with a tire.

Referring now more particularly to the characters of reference on the drawings, the tape 1 is of flexible steel and is of sufficient length to be used in connection with any size tire, being graduated on one face in inches or other units of measurement. One end of the tape is free while the other end is connected to a block 2 of special form. The inner face of the block on the portion adjacent the connection of the type therewith is convexly curved as at A to closely fit the exterior contour of a tire 3 at the bead 4; the face being recessed as at 5 to receive the pivoted end of the tape so that said tape will not interfere with the close engagement of the block with the tire. At the base of the curved surface the block is provided with a shoulder 6 to project under the bead and prevent the block from slipping outwardly about the tire. Beyond said shoulder or opposite to the curved bead-engaging face the block is provided with a finger-grip portion 7 preferably suitably curved on its inner face to be engaged by the finger of the operator.

Slidable through the block in the plane of the shoulder and at right angles to the flat plane of the tape is a stem 8, the inner end of which beyond the shoulder has a hook 9 to engage the inner face of the tire at the bead. The hook is drawn toward the shoulder so as to be frictionally held in contact with the bead by means of a compression spring 10 about the stem outwardly of the block. The tape is graduated from the block end thereof toward the other end, the graduations being so disposed relative to the block so that the starting point or zero of measurement is at the junction of the shoulder 6 with the curved face A. By this arrangement the accurate measurement of the tire from edge to edge of the opposite beads may of course be readily obtained without any guesswork.

In operation it is only necessary to compress the spring so that the hook will be separated from the blocks efficiently to receive the tire bead therebetween. This is done by laying the block against the tire, grasping said block by one finger and pushing on the outer end of the stem with the other. When the block is thus positioned the pressure on the stem may of course be released and the block will remain then in a rigid position on the tire.

When the block is thus positioned the tape is naturally disposed in the radial plane of the tire, and it is then passed about said tire, care being taken to cause the tape to closely follow the contour of the tire throughout its extent, as plainly shown in Fig. 2. The reading on the tape is then taken at the point where the tape intersects the outer edge of the bead opposite to the block, for the purpose fully set forth in said previously mentioned co-pending application for patent.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described my invention what

I claim as new and useful and desire to secure by Letters Patent is:

1. A measuring device comprising a length of flexible tape, a block to one end of which the tape is secured, said block adapted to abut against the outside of a tire at the bead and shaped to follow the contour of the bead and to also pass under the bead, a stem slidable through the block lengthwise of the tape, a hook on the inner end of the stem to engage the inner face of said bead, and spring means acting on the stem to yieldably draw the hook toward the block.

2. A measuring device comprising a length of flexible tape, a block having one face adapted to engage the outside of a tire at the bead and to which one end of the tape is secured, and means mounted in connection with the block and projecting from the bead engaging face thereof to yieldably engage the inner face of the tire-bead to hold the block firmly against the outside of the bead.

3. A device as in claim 1, with a finger grip portion formed with the block on the end thereof, opposite to the bead engaging portion of the same.

4. A tire measuring device comprising a block having a face curved to abut against and follow the contour of the outside of a tire at the bead, a flat shoulder formed with the block at one end of the block to project under and engage the bottom of the tire-bead, and a flexible tape connected at one end to the block and projecting from that end of the curved face of the block which is opposite the shoulder.

In testimony whereof I affix my signature.
HERBERT J. WOOCK.